US 6,486,975 B1

(12) United States Patent
Verreault et al.

(10) Patent No.: US 6,486,975 B1
(45) Date of Patent: Nov. 26, 2002

(54) METHOD AND DEVICE FOR RECOGNIZING TONES AND SEQUENCES THEREOF

(75) Inventors: Eric Verreault, Kanata (CA); John C. Fischer, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/260,047

(22) Filed: Mar. 2, 1999

(30) Foreign Application Priority Data

Jul. 3, 1998 (CA) .......................................... 2,242,187

(51) Int. Cl.[7] .............................. H04N 1/00; H04N 1/40
(52) U.S. Cl. ........................ 358/445; 358/400; 358/434
(58) Field of Search ................................. 358/400, 445, 358/468, 434; 379/386, 100.15, 100.17, 93.34; 375/340, 222; 370/241, 242, 246, 526

(56) References Cited

U.S. PATENT DOCUMENTS 5,065,427 A * 11/1991 Godbole ..................... 358/400
5,440,619 A * 8/1995 Cann ....................... 379/93.34
5,631,745 A * 5/1997 Wong et al. ................ 358/434

OTHER PUBLICATIONS

ITU–T, *Procedures for Document Facsimile Transmission in the General Switched Telephone Network*, ITU–T Recommendation T.30, Mar. 1993.

ITU–T, *300 Bits Per Second Duplex Modem Standardized for use in the General Switched Telephone Network*, ITU–T Recommendation V.21, 1993.

* cited by examiner

*Primary Examiner*—Kimberly A. Williams
(74) *Attorney, Agent, or Firm*—Blake, Cassels & Graydon LLP (57) ABSTRACT

A method for recognizing tones in a signal in a telecommunication transmission uses samples of the signal to determine whether a tone of an expected frequency and wave shape is contained in the signal. If the method accurately predicts the value of the next sample, then a tone of the expected frequency and wave shape has been detected. Another method may be used to recognize sequences of tones comprising intervals with particular frequencies and durations. The method may be applied to the detection of initiation sequences for fax and modem transmissions, for example the ITU-T recommendation T.30 V.21 fax initiation sequence and the ITU-T recommendation V.25 modem transmission preamble. The method may be incorporated in a device for detecting modem or fax transmissions on a line and routing such modem and fax transmissions to a modem/fax relay. Thus the invention can be used with devices which provide voice compression by ensuring that fax and modem transmissions are not corrupted by being passed through the voice compressors.

30 Claims, 3 Drawing Sheets

METHOD AND DEVICE FOR RECOGNIZING TONES AND SEQUENCES THEREOF

FIELD OF THE INVENTION

The invention relates to the field of tone recognition in telecommunications and more particularly to the detection of particular sequences of tones used to indicate the initiation of a fax transmission.

BACKGROUND OF THE INVENTION

It has become common in voice communication networks to employ voice compression technology in order to increase the number of connections that may be carried on a limited number of lines in a network. Because a human voice signal contains significant redundancy, digitized voice communications are readily compressible using any of a number of available voice compression algorithms. Although some signal quality is lost when a voice transmission is compressed, the losses in quality are usually minimal and offset by the lower costs derived from the use of more voice paths on fewer lines. Voice compression ratios in the range of 4:1 and 8:1 and higher have become common in telephone transmission, and though quality of the voice signal may be slightly compromised at these ratios, the quality remains high enough for effective communication.

Most communication networks which carry voice transmissions are also used for carrying data transmission. The most common example of a network which carries both voice and data transmissions is the general switched telephone network which carries voice, fax and modem transmissions. Because data transmissions such as fax and modem contain different information redundancy than voice transmissions, data transmissions are not properly propagated through compressed voice channels. Fax and modem transmissions may however be compressed using compression techniques specifically designed for such transmissions. The extent to which voice compression will degrade a fax transmission depends on a number of factors, including the speed of the fax transmission, the sophistication of the voice compression algorithm and the compression ratio. For example a slow (eg. 2400 bits per second) fax transmission could succeed in being properly exchanged on a voice compression channel, but higher bit rate transmissions like 14.4 kbps would fail.

Therefore, in order for a mixed voice/data communication network to support high voice compression rates, fax transmissions must be detected and routed over uncompressed lines or fax relays so that the fax transmissions are not propagated through the voice compression system.

Under International Telecommunication Union Telecommunication Standard Sector's (ITU-T) Recommendation T.30, fax transmissions are initiated by the transmission of a ITU-T V.21 300 bit per second (b.p.s.) FSK (frequency-shift-keying) modulated signal. The initial sequence of the ITU-T V.21 signal consists of the repeated transmission of many HDLC (High level Data Link Control) IDLE flags each consisting of the binary sequence 01111110. In the V.21 channel 2 FSK modulation, 1's are represented by a 1650 Hz tone and 0's are represented by a 1850 Hz tone. Thus, the initiation sequence of the fax transmission is indicated by an initial tone at 1850 Hz for a duration of 3.3 milliseconds (corresponding to one 0 at 300 b.p.s.) followed by a tone at 1650 Hz for a duration of 20 milliseconds (corresponding to the six 1's at 300 b.p.s.) followed by a tone at 1850 Hz for a duration of 6.6 ms (corresponding to the two 0's at 300 b.p.s.). Thereafter an alternating sequence of tones at 1650 Hz for 20 ms and at 1850 Hz for 6.6 ms is repeatedly transmitted.

The T. 30 protocol also allows for the sharing of a single 0 bit between two adjacent HDLC IDLE flags. Therefore, it is also possible to encounter a 3.3 ms tone at 1850 Hz between two 20 ms tones at 1650.

Two methods of detecting V.21 fax transmissions are common in the prior art. The first method involves using a tone detector tuned to 1650 Hz. If the tone detector tuned to 1650 Hz detects a predominant 1650 Hz tone in the incoming signal for a particular period of time then a fax transmission is assumed to have been detected and is routed to an uncompressed line or fax relay. The tone detectors used in the prior art are typically band pass filters tuned to 1650 Hz. If a predominant portion of the signal passes through the filter for a particular period of time, then this prior art method assumes that the 1650 Hz tone is predominant because the signal is carrying the initiation sequence of a V.21 fax transmission. This prior art method has several drawbacks including possible false detections which can be triggered by music or sibilance in a voice signal or detection of crosstalk from a fax transmission on another line. In addition, the necessary components for the filters used in this method are relatively expensive. However, one advantage of this technique is that it may be implemented using a relatively small number of operations in a computer.

A second prior art method for detecting a fax transmission uses a V.21 demodulator to perform a full demodulation and conversion of the signal into a bit stream. The bit stream is then analysed for repetition of the specific HDLC bit sequence (01111110) which indicates the beginning of a fax transmission. This method of detection accurately detects fax transmissions and reduces the probability of false detections encountered in the first method. However, compared to tone detection this method is computationally complex requiring significantly more computer operations making it more expensive and complex to implement on a system.

It can be seen that a method of detecting a fax transmission which is both accurate and simple, requiring fewer computer operations than a full V.21 demodulation, is desirable.

SUMMARY OF THE INVENTION

According to a first broad aspect of the present invention, there is provided a method for recognizing a tone having a tone frequency and a wave shape in a signal in a telecommunications transmission, the method including the steps of sampling the signal at a sampling frequency to obtain first and second consecutive samples of the signal; obtaining a predicted value corresponding to a third consecutive sample of the signal using the first consecutive sample, the second consecutive sample, the tone frequency, the wave shape and the sampling frequency; sampling the signal at the sampling frequency to obtain the third consecutive sample of the signal; deriving a prediction error indicative of the presence of the tone in the signal using the third consecutive sample and the predicted value; and testing the prediction error against a threshold value to determine whether the signal contains the tone.

According to a second broad aspect of the present invention, there is provided a method for recognizing a sequence transmitted in a signal, the sequence having a plurality of tone intervals each having an interval frequency and an interval duration, the method including the steps of: detecting a tone in the signal having a frequency matching the interval frequency of a tone interval of the sequence; timing the tone to obtain a timed duration; detecting a subsequent tone having a frequency matching the tone frequency of a subsequent tone interval of the sequence if the timed duration of the previous tone matches the interval duration of the previous tone interval; timing the subsequent tone in order to obtain a subsequent timed duration; and repeating the previous two steps to detect and time subsequent tones until, for every tone interval in the sequence, a tone is detected having a frequency and a timed duration matching the interval frequency and the interval duration of a corresponding tone interval.

According to a third broad aspect of the present invention, there is provided a method for recognizing a fax transmission in a signal, the fax transmission having an initiation sequence for indicating the beginning of the fax transmission, the initiation sequence having a plurality of tone intervals each having an interval frequency, an interval duration and a wave shape, the device including a tone detector for recognizing tones in the signal having frequencies corresponding to the interval frequencies of the tone intervals in the initiation sequence of the fax transmission, and a sampler for sampling the signal at a sampling frequency to generate digital samples of the signal; wherein consecutive samples are provided to the tone detector and the tone detector uses two consecutive samples, the sampling frequency, the interval frequency and the wave shape to obtain a predicted value of a third consecutive sample, wherein a prediction error indicative of presence of a particular tone in the signal is derived using the third consecutive sample and the predicted value and wherein the prediction error is tested against a threshold value to determine whether the signal contains a tone having a frequency corresponding to the interval frequency.

According to a fourth broad aspect of the present invention, there is provided a device for recognizing a modem transmission in a signal, the modem transmission having an initiation tone for indicating the beginning of the modem transmission, the initiation tone having an initiation frequency and a wave shape, the device including a sampler for sampling the signal at a sampling frequency to generate digital samples of the signal, and a tone detector for recognizing a tone in the signal having a frequency matching the initiation frequency, wherein consecutive samples are provided to the tone detector and the tone detector uses two consecutive samples, the sampling frequency, the initiation frequency and the wave shape to obtain a predicted value of a third consecutive sample, and wherein a prediction error indicative of the presence of the initiation tone in the signal is derived using the third consecutive sample and the predicted value, and wherein the prediction error is tested against a threshold value to determine whether the signal contains a tone having a frequency corresponding to the initiation frequency.

BRIEF DESCRIPTION OF THE DRAWINGS

The present invention will be understood and appreciated more fully from the following detailed description taken in conjunction with the drawings, in which.

DETAILED DESCRIPTION OF PREFERRED EMBODIMENTS

The method of the invention uses available samples of the incoming voice/data transmission to recognize the tones which indicate the beginning of a fax transmission. Typically, in general switched telephone networks, incoming signals are sampled at a fixed sampling frequency of 8000 Hz, though other frequencies may be used. The samples are used to perform various functions on the signal including converting the analog signal to digital format, remodulating and multiplexing the signal with other signals over a shared medium, and compressing the signal. Thus, a constant 8000 Hz stream of samples represented in binary form is already available for the implementation of the method of this invention.

The method of the invention includes a tone recognition method to recognize whether the incoming signal contains a tone of an expected frequency and wave shape. The tone recognition method of the invention uses two consecutive samples of the incoming signal to calculate a predicted value of the subsequent sample based on the expected frequency of the tone and wave shape. The predicted value is then compared to the actual value of the subsequent sample to generate a prediction error. The prediction error is the difference between the predicted value and the actual value of the subsequent sample. If the prediction error is zero, or relatively small amplitude, indicating that the actual value of the subsequent sample is as predicted based upon the expected frequency, then a tone with the expected frequency has been detected. For a sinusoidal wave shape, the predicted value may be calculated by a formula as follows:

$$x'_n = 2x_{n-1}\cos\left(\frac{f_e}{f_s}2\pi\right) - x_{n-2} \qquad (1)$$

where $f_e$ is the expected frequency, $f_s$ is the sampling frequency (typically 8000 Hz in a general switched telephone network), $x_{n-1}$ and $x_{n-2}$ are respectively the first previous and second previous samples of the incoming signal, and $x'_n$ is the predicted value of the subsequent sample. As can be seen from this formula, the predicted value $x'_n$ will change depending on the expected frequency $f_e$. If the incoming signal is a perfect sinusoidal waveform with a frequency which matches the expected frequency $f_e$, then the predicted value $x'_n$ will equal the actual value of the subsequent sample $x_n$. One technique for obtaining a prediction error $E_n$, which is indicative of the match between the waveform of the incoming signal and that of the expected signal, is based on the difference between $x'_n$ and $x_n$:

$$E_n = x_n - x'_n \qquad (2)$$

The values calculated for the prediction error $E_n$ are used to determine whether a tone having the expected frequency has been detected. Stated simply, $E_n$ is checked and if the absolute value of $E_n$ is relatively small then the method indicates that a tone of the expected frequency has been detected. This may be done by comparing the absolute value of the prediction error $|E_n|$ against a threshold level, where if the absolute value of the prediction error $|E_n|$ is less than the threshold level then the method determines that a tone of the expected frequency is present in the incoming signal. A problem with this method of testing $E_n$ however is that the method is not sensitive to variations which may take place in the power of the incoming signal. For example, a set of $x_{n-2}=x_{n-1}=x_n=0$ will deliver an error of zero. It will be appreciated that an incoming signal with low power will generate a small prediction error that could be lower than the fixed threshold even though a tone of the expected frequency is not present, thus generating false detections.

In order to reduce the occurrences of false detections based upon incoming signals associated with variations in signal power, the preferred method according to the present invention determines the average power of the incoming signal in order to ensure that the average power of the incoming signal is above a minimum power level. The predicted value $x'_n$ and the prediction error $E_n$ are only calculated and tested if the average power of the incoming signal is greater than the minimum power level. Alternatively, $E_n$ and $x'_n$ may be calculated if the average power of the incoming signal is less than the minimum power level, but the results rejected. However, only calculating $E_n$ and $x'_n$ when the average power of the incoming signal is greater than the minimum power level reduces the number of operations performed by the method and is therefore preferable.

Prediction errors may also be low as a result of an incoming signal having segments which map to a sinusoidal signal even though overall the incoming signal is not sinusoidal. In such a case, the prediction error may be low for a single or few instances because a brief segment of the signal corresponds to a sinusoidal wave with the expected frequency. This can also generate false detections. Therefore, it is desirable that the method not indicate that a tone has been detected based on the value of only one prediction error.

In order to reduce the occurrences of false detections based upon a brief segment of the incoming signal mapping to a sinusoidal signal, several measures can be taken. One of the preferred measures involves determining the average power of the prediction error based on the prediction errors of historic samples and using this average instead of using only the absolute value of the prediction error $|E_n|$ corresponding to the most recent sample $x_n$ to determine whether the tone has been detected. To further ensure that a tone is not falsely declared when the prediction error has only been determined to be small once or a few times in succession, the tone detection method is preferably designed to declare the presence of a tone of the expected frequency after the average power of the prediction error has remained low for a configurable number of samples.

In order to further enhance the accuracy of the prediction error $E_n$, a more sophisticated DSP notch filter may be implemented. It can be seen from the above that the prediction error may be expressed as the following:

$$E_n = x_n - 2x_{n-1}\cos\left(\frac{f_e}{f_s}2\pi\right) + x_{n-2}$$

In mathematical terms the detection operation is a single input (signal $x_n$), single output (error $E_n$) system. Such a system can be defined using the Z transform:

$$\frac{E(z)}{x(z)} = H(z) = 1 + \alpha_1 z^{-1} + \alpha_2 z^{-2}$$

in which:

$$\alpha_1 = -2\cos\left(\frac{f_e}{f_s}2\pi\right)$$

and:

$$\alpha_2 \times 1$$

It will be appreciated by those skilled in the art that such a system is a second order non-recursive notch filter. Previous error values can be included to convert the system in a recursive notch filter represented by the transfer function:

$$H_2(z) = \frac{1 + \alpha_1 z^{-1} + \alpha_2 z^{-2}}{1 + \beta_1 z^{-1} + \beta_2 z^{-2}}$$

Higher order transfer functions may also be used, for example a higher order non-recursive system:

$$H_3(z) = 1 + \alpha_1 z^{-1} + \alpha_2 z^{-2} + \alpha_3 z^{-3} +$$

or a higher order recursive system:

$$H_4(z) = \frac{1 + \alpha_1 z^{-1} + \alpha_2 z^{-2} + \alpha_3 z^{-3} + \ldots}{1 + \beta_1 z^{-1} + \beta_2 z^{-2} + \beta_3 z^{-3} + \ldots}$$

These higher order systems implement a notch filter with a narrower frequency band in the notch. Thus, $E_n$ may be calculated using a higher order transfer function in order to increase the accuracy of the tone detection method.

The value for the average power Power$_n$ of the incoming signal may be roughly estimated using the formula:

$$Power_n = \frac{N-1}{N}Power_{n-1} + \frac{1}{N}|x_n| \quad (3)$$

In equation (3), the parameter N is a decay factor. The decay factor determines the relevance of past samples in calculating the estimated average power, Power$_n$. Power$_{n-1}$ is the estimated average power as calculated after the previous sample $x_{n-1}$ was taken. It can be seen that the smaller N is, the less relevance past samples will have in determining the estimated average power of the signal. For N=1, Power$_n=|x_n|$ and the estimated power of past samples does not factor into the calculation of the average power. The decay factor can be set as high or as low as desired, but those skilled in this art will appreciate that in order to have a measurement of estimated average power that responds fairly quickly to changes in the power of the incoming signal, it is desirable to keep N below a certain level. The preferred value for N in the present preferred embodiment when used for detection of ITU -T V.21 and V.25 fax and modem transmissions is in the range of 4 to 64 for a sampling rate of 8000 Hz. It will be appreciated by those skilled in the art that any other method to compute or estimate the average power of the incoming signal can be used with the present invention.

The average power of the prediction error is estimated using an equivalent formula:

$$EPower_n = \frac{N-1}{N}EPower_{n-1} + \frac{1}{N}|E_n| \quad (4)$$

where $E_n$ is the prediction error calculated as discussed above. The value of the decay factor N used to calculate the estimated average power of the prediction error $EPower_n$ should be, but is not restricted to be, the same as the value used for the decay factor in the calculation of the estimated average power of the incoming signal such that the estimated average power of both the incoming signal and the prediction error are calculated with the same weighting for historical samples. If the decay factors for these two calculations are far apart, then $Power_n$ and $EPower_n$ will respond to changes in the incoming signal at different rates. It will be appreciated by those skilled in the art that any other method to compute or estimate the average power of the prediction error can be used with the present invention.

Figure 1:
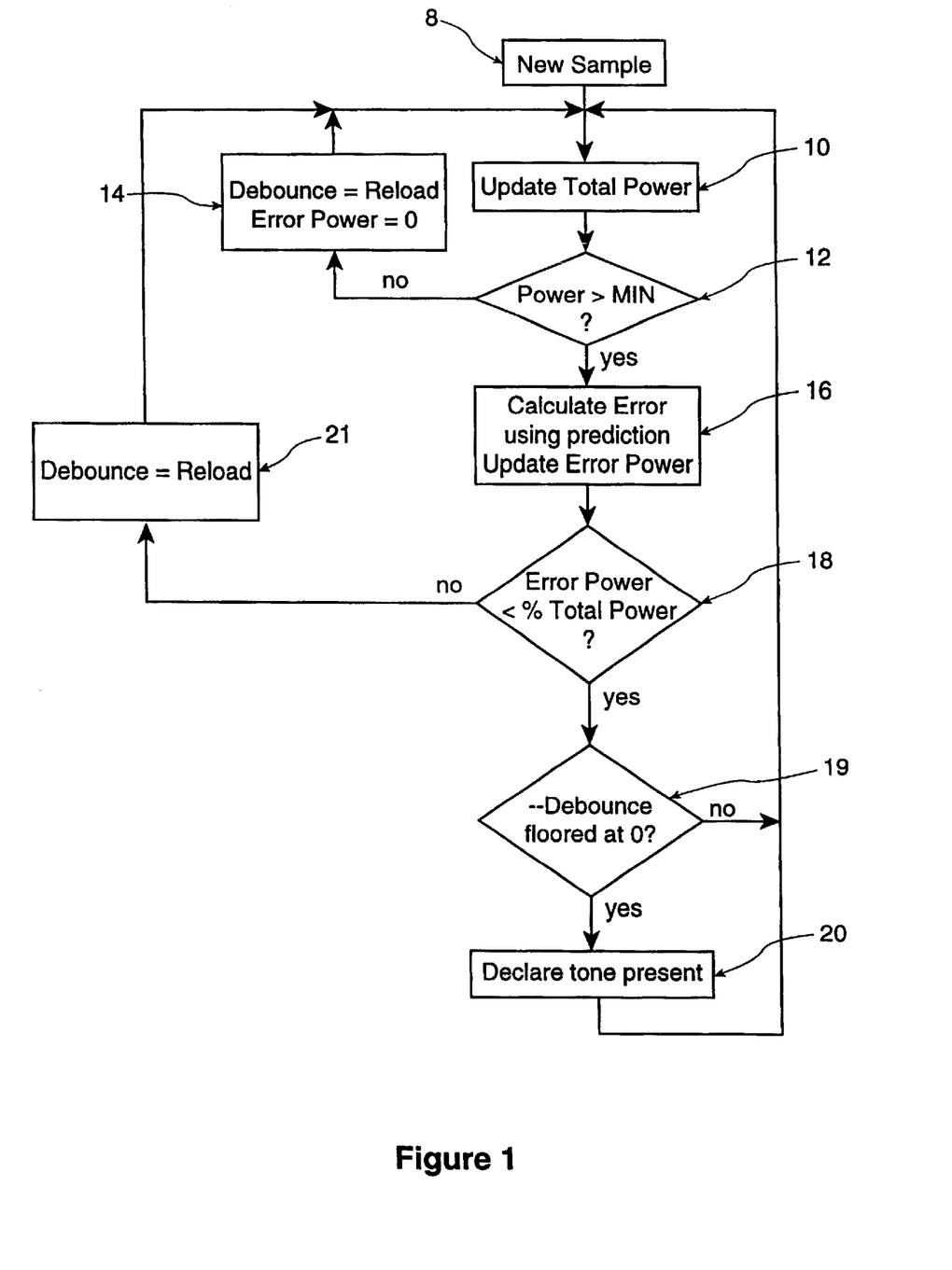
FIG. 1 is a flow chart of the tone detection method according to one preferred embodiment of the present invention.

The flowchart in FIG. 1 shows the steps involved in the tone recognition method of the invention. Beginning with block 8, each time the incoming signal is sampled, the average input power is estimated using equation (3) at block 10. Next, the average input power is compared against a minimum signal power threshold at block 12. This minimum signal power threshold is indicated as, "MIN". If the average power of the incoming signal is less than this minimum signal power threshold, the predicted value and prediction error are not calculated and $EPower_n$ is set to zero, as at block 14. Also at block 14, a counter variable known as "Debounce" is reset. This counter variable is discussed in greater detail below. As can be seen from the flowchart of FIG. 1, the checking of the power of the incoming signal not only helps to avoid certain false detections, but also saves the CPU of the device in which the tone detection method is implemented from executing unnecessary calculations of $x'_n$ and $E_n$. The minimum signal power threshold may be set to any value as may be considered appropriate by one skilled in the art, but for typical telephone networks, values between −30 and −40 dBmO are recommended. If one wishes, the computation of the error and $EPower_n$ can be performed at the expense of extra computational resources.

If the average power of the incoming signal is higher than the minimum signal power threshold, then the predicted value $x'_n$, prediction error $E_n$ and the average power of the prediction error $EPower_n$ are calculated at block 16. Next, at block 18 the average power of the prediction error $EPower_n$ is then compared to the average power of the incoming signal $Power_n$. In block 19, a count variable identified as "Debounce" is decremented each time $EPower_n$ is less than the configurable fraction of $Power_n$. The Debounce count is originally set to equal the number of samples for which $EPower_n$ must be less than the configurable fraction of $Power_n$, as explained below. That number is indicated as "Reload" in block 21. When the Debounce count is decremented to zero the tone detection method declares that a tone of the expected frequency is present, as at block 20.

For each subsequent sample, as long as $EPower_n$ remains less than the configurable fraction of $Power_n$, the tone will be repeatedly declared present. If the tone is lost and $EPower_n$ is no longer less than the configurable fraction of $Power_n$, the Debounce count is reset at block 21 to the value "Reload", as mentioned previously. The Debounce count is also reset at block 14 if $Power_n$ drops below the minimum threshold power. Once the Debounce count is reset at blocks 14 or 21, it must again be decremented to zero before a tone of the expected frequency is again declared. The net effect of the Debounce count is to ensure that $EPower_n$ must be based on a minimum number of historic prediction errors before a tone is declared.

The preferred fraction of the average power of the incoming signal against which the average power of the prediction error is compared should be configured between 1% and 50%. Thus, for a fraction of 10%, a tone will be detected if the tone of the expected frequency accounts for at least 90% of the power of the incoming signal.

The tone recognition method disclosed above may be used to recognize a simple sustained tone of a particular frequency or alternatively may be enhanced to incorporate a sequence recognition for detecting particular sequences of tones. An example of the first possible use of the tone recognition method could be its implementation to detect ITU-T V.25 modem preamble transmissions. These V.25 modem preamble transmissions on the general switched telephone network are initiated by a 2100 Hz tone with optional phase reversals for indicating that the transmitting modem is full duplex. Unlike the ITU-T V.21 initiation for fax transmissions, the V.25 modem initiation consists of a constant tone without changes in tone frequency. In order to detect a V.25 initiation signal, the expected frequency $f_e$ is set to 2100 Hz and the steps of the tone recognition method disclosed above and illustrated in FIG. 1 are executed. When the average power of the prediction error is determined to be less than the average power of the incoming signal for the predetermined number of samples, the tone detection method declares that a 2100 Hz tone is present. The device implementing the tone detection method would then process the incoming modem transmission accordingly, for example by re-routing the modem transmission to an uncompressed line or a modem relay.

Figure 2:
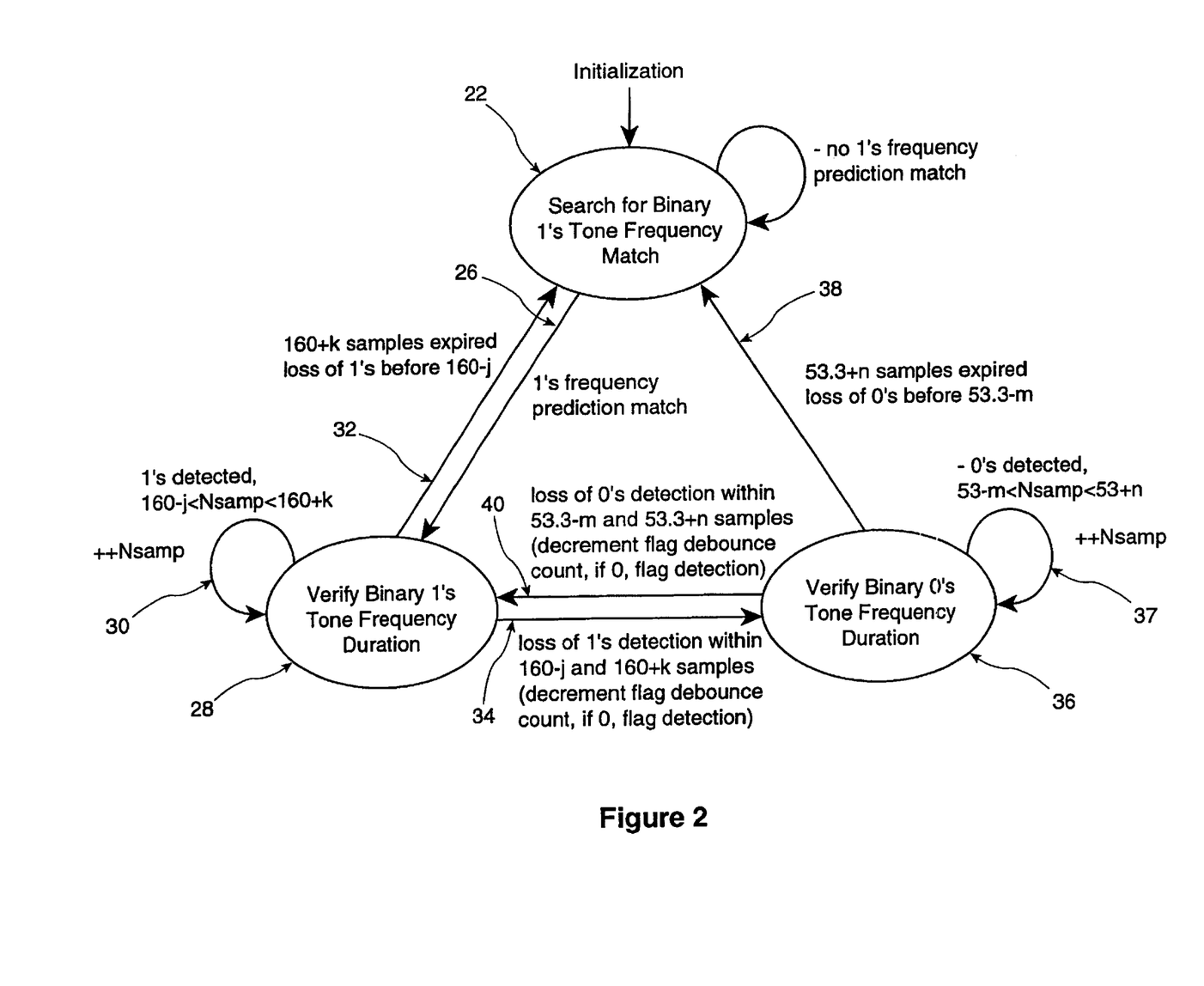
FIG. 2 is a state diagram of a fax detection method according to another preferred embodiment of the present invention.

The tone detection method disclosed above may also be incorporated into a method for detecting a sequence of tones. In particular, the tone detection method may be incorporated into a method for detecting a particular sequence of bits which has been FSK modulated. For example, the tone detection method may be used to detect the initiating HDLC flags of an ITU-T V.21 fax transmission. The state diagram of FIG. 2 illustrates the incorporation of the tone detection method in a method for detecting the V.21 fax transmission initiation sequence. As described above, this initiation sequence basically consists of the repeated transmission of six 1's followed by one or two 0's at 300 b.p.s. using the two tone frequencies 1650 Hz and 1850 Hz respectively. At 300 b.p.s., six 1's are represented by a 20 ms 1650 Hz tone, two 0's are represented by a 6.66 ms 1850 Hz tone and one 0 is represented by a 3.3 ms 1850 Hz tone.

In order to detect a 1650 Hz tone, equation (1) above is calculated, with a value of $f_e$ equal to 1650 Hz. Likewise, equation (1) is calculated with $f_e$ equal to 1850 Hz in order to detect an 1850 Hz tone. Therefore, a different predicted value is calculated using equation (1) depending on which frequency is expected, 1650 Hz or 1850 Hz. Thus, the two possible predicted values corresponding to an expected frequency, $f_e$, of 1850 Hz and 1650 Hz may be calculated as follows:

$$x'^{1650}_n = 2x_{n-1}\cos\left(\frac{1650}{f_s}2\pi\right) - x_{n-2} \quad (1.1)$$

$$x'^{1850}_n = 2x_{n-1}\cos\left(\frac{1850}{f_s}2\pi\right) - x_{n-2} \quad (1.2)$$

Depending upon what the expected frequency is, the tone detector will predict either $x'^{1650}_n$ or $x'^{1850}_n$. The predicted value, $x'^{1650}_n$ or $x'^{1850}_n$ as the case may be, is compared against the actual value of the subsequent sample $x_n$ to generate the prediction error $E_n^{1650}$ or $E_n^{1850}$.

The prediction error, $E_n^{1650}$ or $E_n^{1850}$, is used to determine whether a tone of the expected frequency has been recognized. Once a tone has been recognized it is timed. If the duration of the tone corresponds to the expected duration of the tone (ie 20 milliseconds for a 1650 Hz tone, or 6.66 or 3.33 milliseconds for a 1850 Hz tone) then the method begins timing the duration of the next tone. If this next tone also corresponds to the expected duration, then the method determines that a matching sequence has been detected.

A more detailed explanation of the state diagram of FIG. 2 for the fax detection method will now be provided. When the fax detection method is initiated, the method begins at a first state 22 by searching for binary 1's using the tone detection method with an expected frequency of 1650 Hz ($f_e$=1650 Hz). When the tone detection method recognizes a 1650 Hz tone, the duration of the tone is measured. This is shown in the state diagram of FIG. 2 by a second state 28. State transition arrow 26 shows the transition from the first state 22 to the second state 28 which occurs when the 1650 Hz tone is detected. In the second state 28 a detection counter is incremented for each sample for which a 1650 Hz tone is detected. The detection counter is represented in FIG. 2 as $N_{SAMP}$ and the incrementation of $N_{SAMP}$ is shown by arrow 30. This detection counter is used to roughly time the duration of the 1650 Hz tone.

A 20 millisecond tone sampled at a rate of 8000 Hz, yields 160 samples. Therefore, if for the duration of a 1650 Hz tone the detection counter is incremented to a number greater than 160, then the method determines that the tone has lasted too long and the incoming signal does not match the expected sequence of six 1's followed by two 0's. Likewise, if the tone is lost before the detection counter is incremented to 160, then the method determines that the duration of the tone was too short and therefore does not match the expected sequence. If the tone is not held for the expected duration of 160 samples, then the method returns to the first state and resumes searching for a 1650 Hz tone in the incoming signal. In fact, preferably the detection count is only required to be within a range of 160. This range is indicated in the state diagram by 160–j and 160+k where j and k are configurable integers, as explained below. The value 160–j represents the minimum number of detections of the 1650 Hz required for the method to determine that a sequence of at least six 1's has been received. If the tone is detected more than 160+k times, then the method determines that the 1650 Hz tone has been held too long to correspond to a sequence of only six 1's. The state transition arrow 32 represents the transition which occurs if the tone ends when $N_{SAMP}$ is less than 160–j or if $N_{SAMP}$ is incremented to a value greater than 160+k. The values for j and k depend upon the values of the decay factor N and the Debounce count. The larger the value of N, the longer it will take for the average power of the prediction error $EPower_n$, to drop below the configurable fraction of $Power_n$ when a tone of the expected frequency begins. This delay will shorten the number of possible tone detections during a 20 ms tone. Likewise, the Debounce count will also delay the detection of the expected frequency. It will be appreciated by those skilled in the art that the values for j and k may be determined by testing a range of values in order to determine which values provide the highest levels of accuracy. The values of j and k may also be configured to establish a more flexible envelope of time within which the tone is expected to last. That is, the values of j and k may be set to provide a tolerance range for the duration of the tone.

While in the second state 28, if the 1650 Hz tone is lost when the detection count is in the range of 160–j<$N_{SAMP}$<160+k the method determines that a sequence of six 1's has been received and the method begins to time the duration of a 1850 Hz tone. State transition arrow 34 shows this transition from the second state 28 to a third state 36 which occurs when the six consecutive 1's have been detected. During the transition from the second state 28 to the third state 36, the detection counter $N_{SAMP}$ is reset. While in the third state 36, the method performs the same tone recognition method as performed during the second state, except that in the third state 36 the expected frequency is 1850 Hz corresponding to the sequence of 0's. During the third state the detection counter $N_{SAMP}$ is incremented after each detection of the 1850 Hz tone 37.

If the 1850 Hz tone does not have a duration of approximately 53 samples corresponding to 6.6 ms sampled at 8000 Hz for two 0's, then the method determines that the expected sequence of six 1's followed by two 0's has not been detected and the method reverts to searching for a 1650 Hz tone in the incoming signal. State transition arrow 38 shows this transition from the third state 36 back to the first state 22. The method switches from the third state 36 to the first state 22 if the 1850 Hz tone is lost before the detection counter $N_{SAMP}$ is greater than 53–m, or if the detection counter is incremented to a value greater than 53+n indicating that more than two 0's have been detected. Similar considerations apply to configuring values for m and n as discussed above with respect to j and k. It will be appreciated that where the 0's are shared by consecutive HDLC IDLE flags the method looks for 1850 tone durations of 3.3 ms corresponding to one 0. In such a case, the method looks for tone durations with $N_{SAMP}$ in the range of 27–m to 27+n, where 27 roughly corresponds to the number of samples during a 3.3 ms period. Alternatively, the value for m may be chosen in order to accomodate tone durations in the range of 3.3 ms to 6.6. For example a value of m=33 could be used such that tone durations between 20 and 53+n samples are detected. For simplicity however, this remainder of the description will generally be restricted to the case where two 0's are transmitted between the six 1's in an HDLC IDLE flag.

While in the third state 36, if the 1850 Hz tone is lost when the detection counter is within the expected range, ie. 53–m<$N_{SAMP}$<53+n, (or 27–m<$N_{SAMP}$<27+n where th 0's are shared) then the method determines that a sequence of two 0's (or one 0) has been received on the incoming signal and the method switches back to the second state 28 and begins timing the duration of a 1650 Hz tone. The state transition arrow 40 shows this transition from the third state 36 back to the second state 28.

Every time the method switches from the second state 28 to the third state 36, or from the third state 36 back to second state 28, a transition count is incremented. In FIG. 2 the transition count is referred to as the "flag debounce count". When a configurable number of state transitions 34 or 40 have been recorded, the method confirms that the expected sequence of six 1's and two 0's has been detected. The more transition counts that are required before the method confirms the detection of the expected sequence the more likely it is that only true fax transmissions will be detected. However, the higher the number of transition counts necessary for a positive fax detection, the longer it will take to detect and re-route the fax. Thus, those skilled in this art will understand that the desired transition count must be determined with the competing objectives of accuracy and response time in mind.

It will be appreciated by those skilled in the art that the tone detection method disclosed above may be modified when used to detect a sequence of tones such that the method searches for more than just one tone at the initial state.

Instead the tone detection method could be modified so that multiple prediction errors are calculated based on the expected frequencies of multiple expected tones. If the average power of one of the prediction errors is low, then a tone with a frequency corresponding to that prediction error is detected. For example, the method could initially search for binary 1's and binary 0's by calculating and testing prediction errors based on both 1650 Hz and 1850 Hz. This method has the disadvantage of requiring additional calculations that may slow down the tone detection method and deprive other functions of CPU time. These extra calculations are unnecessary in situations where the tone sequence is repeated such that it is possible to search for one frequency before searching for another frequency.

The method for detecting a particular sequence of tones described above used the tone detection method disclosed in this specification. However, it will be appreciated by those skilled in the art that there are other methods for detecting tones which could be used with the method for detecting a particular sequence tones disclosed herein.

It will be understood by those skilled in the art that the methods disclosed herein may be used for the detection of various different sequences of tones. For example, the method of the invention could be modified so that tone sequences consisting of more than two tones could be detected. Similarly, the method could be adapted to detect more complex binary sequences which include more than just a series of 1's followed by a series of 0's. For example, the method could be adapted to detect the repeated transmission of the bit sequence 00111010. In each of these cases, the state diagram for the detection method would show more than three states, which was all that was required for the state diagram for the V.21 fax detection method shown in FIG. 2.

Figure 3:
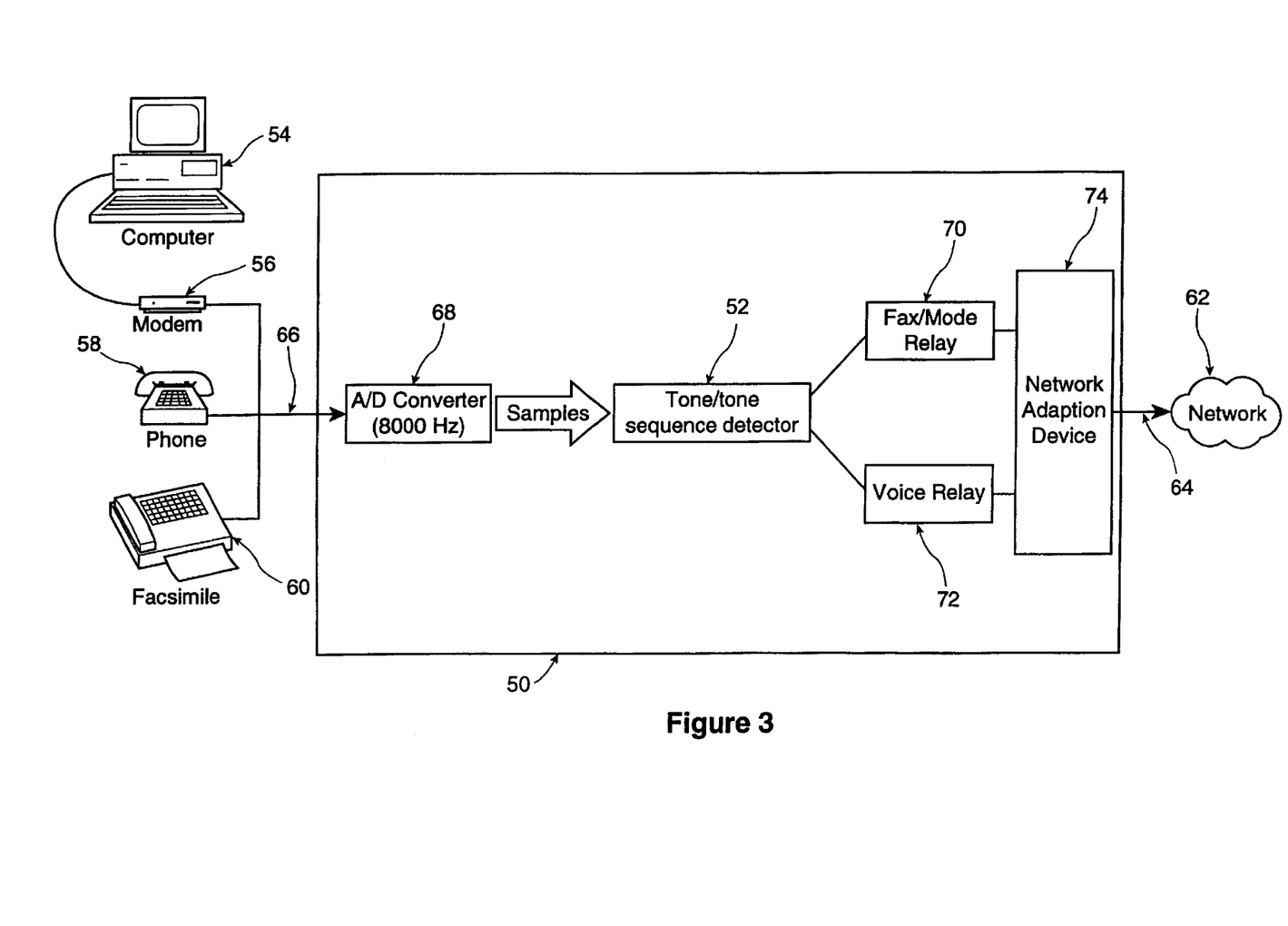
FIG. 3 is a system block diagram of a device implementing a fax/modem detector according to another preferred embodiment of the present invention.

The methods of tone detection or tone sequence detection according to the preferred embodiments of this invention may be incorporated into various devices used in telecommunications systems, for instance by implementing them in software executed by a CPU or in hardware with dedicated elements. In particular, the methods may be implemented in telecommunication systems which carry both voice and data signals. It will be appreciated by those skilled in the art that in such systems it is often desirable to distinguish between voice and data signals and process these signals in different manners. One example of a device in which the methods of the invention may be implemented is a bandwidth manager which handles both voice and data traffic. Referring to FIG. 3, a bandwidth manager 50 implements the methods of the invention in a tone/tone sequence detector 52. The bandwidth manager 50 connects a series of local communication devices (for instance including a computer 54 with a modem 56, a telephone 58, and a facsimile machine or fax 60 to a network 62 via a network connection 64. The network 62 may be any form of communications network including a private switched telephone network, the Internet or an ATM network. The network connection 64 may be any type of telecommunications connection including a T1 or E1 telecommunications line or the like.

Signals from the telephone 58, modem 56, and fax 60 are provided to the bandwidth manager via a common connection 66 which is connected to an A/D converter 68 in the bandwidth manager 50. The A/D converter 68 samples the signal provided on the common connection 66 at a sampling frequency of 8000 Hz. The samples are provided to the tone/tone sequence detector 52 which analyzes the samples as described herein to determine whether the signal on the common connection is a fax or modem transmission. If the tone/tone sequence detector 52 determines that the signal is a fax or a modem transmission then the stream of samples is provided to a fax/modem relay 70. If a fax or modem transmissions is not detected by the tone/tone sequence detector 52 then the samples are provided to a voice relay 72. Various operations may be performed on the samples if they are provided to the voice relay 72. For example, the signal represented in the samples may be compressed by processing the samples using a compression algorithm. If the samples are provided to the fax/modem relay 70, the signal would not be compressed in order to ensure that the fax or modem transmission does not degrade. The fax/modem relay 70 and the voice relay 72 are preferably implemented using digital signal processors. Both the fax/modem relay 70 and the voice relay 72 are connected to the network connection by a network adaptation device 74. The network adaptation device 74 receives the data from the fax/modem relay 70 and the voice relay 72, processes the data into a format compatible with the network 62 and transmits the data. For example, if the network 62 was an ATM network, the network adaptation device 74 will segment the data into ATM packets and provide addressing and header information. One example of a bandwidth manager in which the method of the invention may be implemented is the 3600 MainStreet™ Bandwidth Manager manufactured by Newbridge Networks Corporation of Kanata, Ontario, Canada.

It will be appreciated that the bandwidth manager 50 in FIG. 3 is only one type of device in which the invention of this disclosure may be implemented, and that other devices incorporating the invention will be apparent to the person skilled in this art. Those skilled in the art will also appreciate that the invention has been described herein by way of example only, and that various modifications of detail may be made to the invention, all of which come within its spirit and scope.

What is claimed is:

1. A method for recognizing a tone having a tone frequency and a wave shape in a signal in a telecommunications transmission, the method comprising the steps of:

a. sampling the signal at a sampling frequency to obtain first and second consecutive samples of the signal;

b. obtaining a predicted value corresponding to a third consecutive sample of the signal using the first consecutive sample, the second consecutive sample, the tone frequency, the wave shape and the sampling frequency;

c. sampling the signal at the sampling frequency to obtain the third consecutive sample of the signal;

d. deriving a prediction error indicative of the presence of the tone in the signal using the third consecutive sample and the predicted value;

e. testing the prediction error against a threshold value to determine whether the signal contains the tone.

2. The method of claim 1, wherein the prediction error is the magnitude of the difference between the predicted value and the third consecutive sample, the threshold value is a predetermined value and the step of testing the prediction error against the threshold value to determine whether the signal contains the tone comprises determining whether the prediction error is less than the threshold value.

3. The method of claim 1, further comprising the step of determining a measure of power of the signal, and wherein the prediction error is a measure of power of the difference between the third consecutive sample and the predicted value, the threshold level is a predetermined fraction of the measure of power of the signal and wherein the step of testing the prediction error against the threshold value to determine whether the signal contains the tone comprises determining whether the prediction error is less than the threshold value.

4. The method of claim 3, wherein the measure of power of the signal is a measure of an average power of the signal based on a plurality of samples thereof, and the measure of power of the difference between the third consecutive sample and the predicted value is a measure of an average power of said difference based on a plurality of such third consecutive samples of the signal and predicted values corresponding thereto.

5. The method of claim 4, wherein the measure of the average power of the signal is computed using the formula:

$$Power_n = \frac{N-1}{N} Power_{n-1} + \frac{1}{N}|x_n|$$

and the measure of the average power of the difference between the third consecutive sample and the predicted value is computed using the formula:

$$EPower_n = \frac{N-1}{N} EPower_{n-1} + \frac{1}{N}|x_n - x'_n|$$

wherein $x_n$ is the third consecutive sample, $x'_n$ is the predicted value of the third consecutive sample, $Power_n$ is the measure of the average power of the signal, $Power_{n-1}$, is the measure of the average power of the signal computed after a previous third consecutive sample, $EPower_n$ is the measure of the average power of the difference between the third consecutive sample and the predicted value, $EPower_{n-1}$, is the measure of the average power of the difference between the third consecutive sample and the predicted value computed after the previous third consecutive sample, N is a decay factor indicative of a relevance of past samples.

6. The method of claim 5, wherein the decay factor N is between 4 and 64.

7. The method of claim 6, further comprising the step of timing the duration of the tone in order to obtain a tone duration value after determining that the signal contains the tone.

8. The method of claim 7, further comprising the steps of determining whether the tone duration value is within a tone duration range, and thereafter, if the tone duration value is within the tone duration range, detecting a second tone having a second particular tone frequency, timing a duration of the second tone in order to obtain a second tone duration value, and determining whether the second tone duration value is within a second tone duration range.

9. The method of claim 8, wherein the wave shape is sinusoidal.

10. The method of claim 9, wherein the method is used to recognize a particular sequence of tones in an FSK modulated signal comprising a first frequency for transmitting a 1 and a second frequency for transmitting a 0.

11. The method of claim 10, wherein the particular sequence of tones is an indicator for indicating that a fax transmission is being transmitted in the signal.

12. The method of claim 11, wherein the fax transmission is transmitted according to ITU-T Recommendation T.30 and the particular sequence of tones represents repeated transmission of an HDLC flag comprising the bits 01111110.

13. The method of claim 12, wherein the signal is routed around a signal compressor if the particular sequence of tones is recognized and the signal is routed to the signal compressor if the particular sequence of tones is not recognized.

14. A method for recognizing a sequence transmitted in a signal, the sequence comprising a plurality of tone intervals each having an interval frequency and an interval duration, the method comprising the steps of
   a. detecting a tone in the signal having a frequency matching the interval frequency of a tone interval of the sequence;
   b. timing the tone to obtain a timed duration;
   c. detecting a subsequent tone having a frequency matching the tone frequency of a subsequent tone interval of the sequence if the timed duration of the previous tone matches the interval duration of the previous tone interval;
   d. timing the subsequent tone in order to obtain a subsequent timed duration;
   e. repeating steps c. and d. to detect and time subsequent tones until, for every tone interval in the sequence, a tone is detected having a frequency and a timed duration matching the interval frequency and the interval duration of a corresponding tone interval.

15. The method of claim 14, comprising the further step of determining that the sequence is not transmitted in the signal if the timed duration or a subsequent timed duration does not match the interval duration of the corresponding tone interval.

16. The method of claim 15, wherein the sequence is an FSK modulation of a binary number, the FSK modulation comprising a first frequency and a second frequency.

17. The method of claim 16, further comprising the steps of processing the signal in a first manner if the sequence is recognized and processing the signal in a second manner if the sequence is not recognized.

18. The method of claim 17, wherein the sequence is an indicator for indicating that a fax transmission is being transmitted in the signal.

19. The method of claim 18, wherein the first manner of processing the signal includes routing the signal around a signal compressor and the second manner of processing the signal includes routing the signal to a signal compressor.

20. A device for recognizing a fax transmission in a signal, the fax transmission comprising an initiation sequence for indicating the beginning of the fax transmission, the initiation sequence comprising a plurality of tone intervals each having an interval frequency, an interval duration and a wave shape, the device comprising:
   a tone detector for recognizing tones in the signal having frequencies corresponding to the interval frequencies of the tone intervals in the initiation sequence of the fax transmission; and
   a sampler for sampling the signal at a sampling frequency to generate digital samples of the signal;
   wherein consecutive samples are provided to the tone detector and the tone detector uses two consecutive samples, the sampling frequency, the interval frequency and the wave shape to obtain a predicted value of a third consecutive sample, wherein a prediction error indicative of presence of a particular tone in the signal is derived using the third consecutive sample and the predicted value and wherein the prediction error is tested against a threshold value to determine whether the signal contains a tone having a frequency corresponding to the interval frequency.

21. The device of claim 20, wherein the tone detector determines a measure of an average power of the signal based on a plurality of samples thereof, and the prediction error consists of a measure of an average power of the difference between the third consecutive sample and the predicted value based on a plurality of such third consecutive samples of the signal and values corresponding thereto, wherein if the prediction error is greater than a predetermined fraction of the measure of the average power of the signal then a tone having a frequency corresponding to the interval frequency is not recognized.

22. The device of claim 21, wherein if the measure of the average power of the signal is less than a predetermined threshold level then the device does not recognize a fax transmission.

23. The device of claim 22, further comprising:
   a timer for determining the duration of selected tones of the signal; and
   a router for routing the signal to a first destination if a series of tones with frequencies and durations corresponding to the interval frequencies and interval durations of every tone interval in the initiation sequence is detected.

24. The device of claim 23, wherein the first destination is a relay.

25. The device of claim 24, wherein the fax transmission is transmitted according to ITU-T Recommendation T.30 and the initiation sequence comprises a first frequency for indicating a 1 and a second frequency for indicating a 0.

26. A device for recognizing a modem transmission in a signal, the modem transmission comprising an initiation tone for indicating the beginning of the modem transmission, the initiation tone having an initiation frequency and a wave shape, the device comprising
   a sampler for sampling the signal at a sampling frequency to generate digital samples of the signal; and
   a tone detector for recognizing a tone in the signal having a frequency matching the initiation frequency;
   wherein consecutive samples are provided to the tone detector and the tone detector uses two consecutive samples, the sampling frequency, the initiation frequency and the wave shape to obtain a predicted value of a third consecutive sample, and wherein a prediction error indicative of the presence of the initiation tone in the signal is derived using the third consecutive sample and the predicted value, and wherein the prediction error is tested against a threshold value to determine whether the signal contains a tone having a frequency corresponding to the initiation frequency.

27. The device of claim 26, wherein the tone detector determines a measure of an average power of the signal based on a plurality of samples thereof, and the prediction error consists of a measure of an average power of the difference between the third consecutive sample and the predicted value based on a plurality of such third consecutive samples of the signal and predicted values corresponding thereto, wherein if the prediction error is greater than a predetermined fraction of the measure of the average power of the signal then a tone having a frequency matching the initiation frequency is not recognized.

28. The device of claim 27, wherein if the measure of the average power of the signal is less than a predetermined threshold level then the device does not recognize a modem transmission.

29. The device of claim 28, further comprising a router for routing the signal to a first destination if a tone with a frequency corresponding to the initiation frequency is detected.

30. The device of claim 29, wherein the modem transmission is transmitted according to ITU-T Recommendation V.25.

* * * * *